United States Patent [19]

McMahon et al.

[11] Patent Number: 5,273,556
[45] Date of Patent: Dec. 28, 1993

[54] PROCESS FOR DISPOSING OF SEWAGE SLUDGE

[75] Inventors: Matthew A. McMahon, Wappingers Falls; Ronald J. McKeon, Beacon, both of N.Y.; Robert F. Heyl, Kingwood, Tex.; Motasimur R. Khan, Wappingers Falls, N.Y.; Kenneth W. McKenzie, Apple Valley, Calif.; Enrique F. Depaz, Poughkeepsie, N.Y.

[73] Assignee: Texaco Inc., White Plains, N.Y.

[21] Appl. No.: 860,470

[22] Filed: Mar. 30, 1992

[51] Int. Cl.[5] .............................................. C10J 3/46
[52] U.S. Cl. ........................... 48/197 R; 48/197 A; 48/209; 48/DIG. 7; 110/342; 110/346; 210/758; 252/373
[58] Field of Search ................ 48/197 R, 197 A, 202, 48/206, 209, 210, DIG. 7; 252/373; 44/605, 280. 281, 282; 210/769, 774, 603, 761, 758, 764, 763, 770; 60/39.02; 110/341, 342, 346, 347, 348

[56] References Cited

U.S. PATENT DOCUMENTS

| | | | |
|---|---|---|---|
| 3,687,646 | 8/1972 | Brent et al. | 48/197 A |
| 4,933,086 | 6/1990 | McMahon et al. | 210/769 |
| 4,983,296 | 1/1991 | McMahon et al. | 210/769 |
| 5,017,196 | 5/1991 | Dewitz | 48/197 R |
| 5,134,944 | 8/1992 | Keller et al. | 110/346 |

Primary Examiner—Peter Kratz
Attorney, Agent, or Firm—James J. O'Loughlin; Albert Brent

[57] ABSTRACT

A process for disposing of sewage sludge by heating and shearing an aqueous mixture of sewage sludge in a tubular-shaped processing means containing a plurality of rotating agitators to produce a pumpable aqueous slurry of sewage sludge. The aqueous slurry of sewage sludge is mixed with solid carbonaceous fuel or an aqueous slurry of solid carbonaceous fuel to produce a pumpable aqueous slurry of sewage sludge and solid carbonaceous fuel. The aqueous slurry of sewage sludge and solid carbonaceous fuel is heated in a first steam jacketed rotary disc mixing-heating means. Alternately, first and second hoppers are filled with said heated aqueous slurry of sewage sludge and solid carbonaceous fuel and cycled between a second steam jacketed rotary disc mixing-heating means; wherein while one hopper is being filled the contents in the other hopper are being dewatered. The thickened pumpable slurry is burned in a partial oxidation gasifier, furnace, boiler, or incinerator to produce a hot effluent gas steam. By this process, noxious sewage sludge may be disposed of without contaminating the environment. By-product synthesis gas, reducing gas, or fuel gas may be produced.

15 Claims, 1 Drawing Sheet

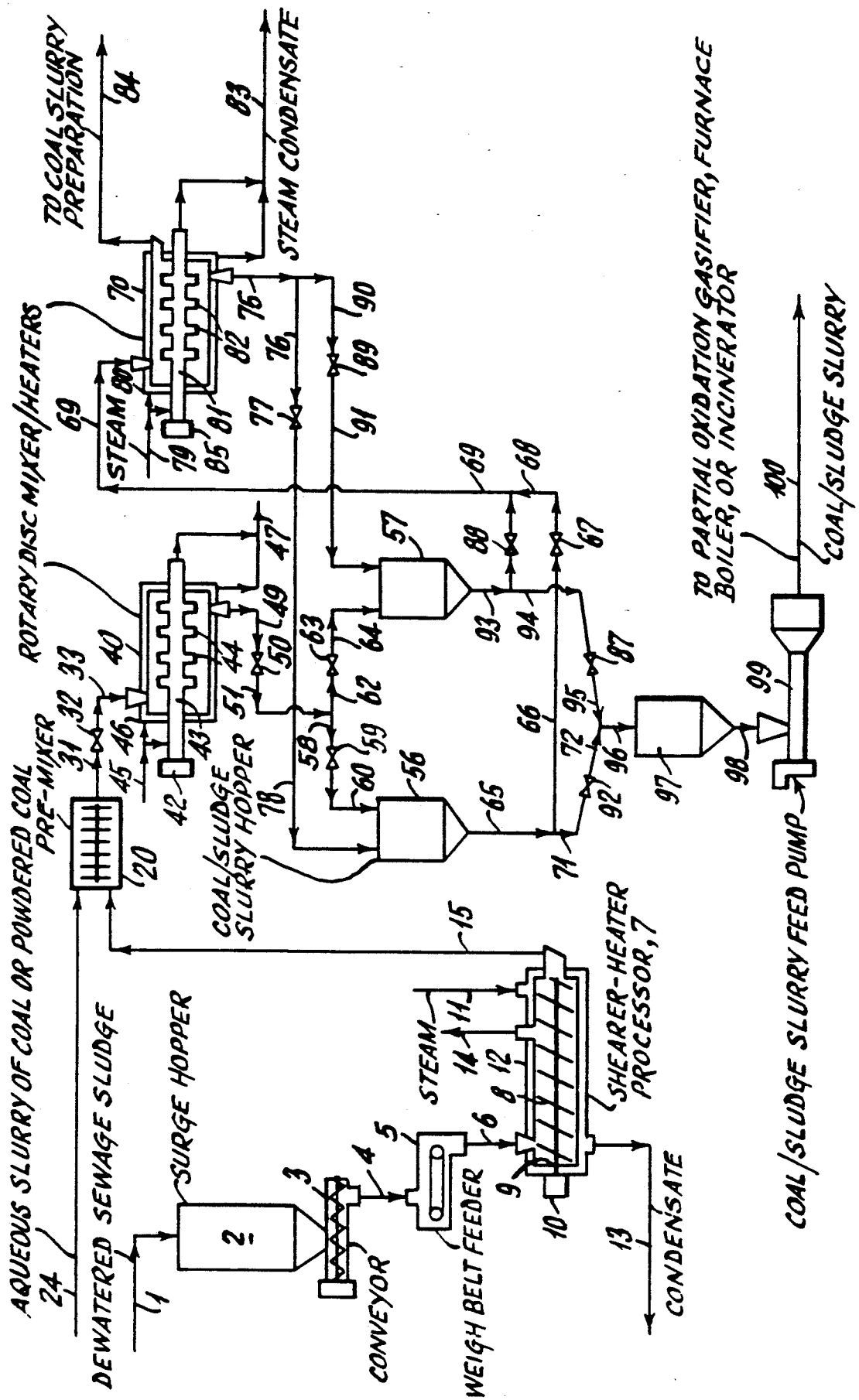

PROCESS FOR DISPOSING OF SEWAGE SLUDGE

FIELD OF THE INVENTION

This invention relates to an environmentally-safe process for disposing of sewage sludge.

Sewage sludge may be gasified in a partial oxidation process described in coassigned U.S. Pat. No. 3,687,646. Upgrading aqueous slurries of sewage sludge by shearing without heating is described in coassigned U.S. Pat. No. 4,933,086. Agglomerating the organic matter in aqueous slurries of sewage sludge by heating, is described in coassigned U.S. Pat. No. 4,983,296. However, none of these references taken singly or in combination, teach or suggest the subject invention in which dewatered sewage sludge is simultaneously heated and intensely sheared at a temperature in the range of about 150° F. to 210° F. in the absence of air while being continuously passed through a tubular shaped processing means containing a plurality of rotating agitators. At least two mixing stages follow including at least one rotary disc mixer/heater to mix the sheared sewage sludge with a solid carbonaceous fuel, such as coal and/or petroleum coke and thereby produce a pumpable slurry having a high solids content. The pumpable slurry may be burned as fuel in a partial oxidation gasifier, furnace, boiler, or incinerator. The subject process is more flexible with respect to removing water from the slurry of sewage sludge and solid carbonaceous fuel in comparison with the process in coassigned, copending U.S. patent application Ser. No. 07/762,186, now abandoned.

SUMMARY OF THE INVENTION

This invention pertains to an improved process for disposing of sewage sludge comprising:

(1) heating and shearing an aqueous mixture of sewage sludge at a temperature in the range of about 150° to 210° F. in a tubular-shaped processing means containing a plurality of rotating agitators to produce a pumpable aqueous slurry of sewage sludge;

(2) mixing said aqueous slurry of sewage sludge with solid carbonaceous fuel or an aqueous slurry of solid carbonaceous fuel to produce a pumpable aqueous slurry of sewage sludge and solid carbonaceous fuel;

(3) heating said aqueous slurry of sewage sludge and solid carbonaceous fuel in a first steam jacketed rotary disc mixing-heating means at a temperature in the range of about 150° F. to 200° F.; and removing a pumpable slurry of sewage sludge and solid carbonaceous fuel from said first rotary disc mixing-heating means;

(4) alternately filling first and second hoppers with said aqueous slurry of sewage sludge and solid carbonaceous fuel from said first rotary disc mixing-heating means;

(5) testing the contents of said second slurry hopper for water content while said first slurry hopper is being filled, and cycling said contents between said second hopper and a second steam jacketed rotary disc mixing-heating means until said slurry mixture is dewatered to a solids content in the range of about 55 to 65 wt. %, before emptying the contents of said second hopper into a third hopper;

(6) refilling said second hopper with said aqueous slurry of sewage sludge and solid carbonaceous fuel while cycling the contents of said first hopper between said first hopper and said second steam jacketed rotary disc mixing-heating means until said slurry mixture is dewatered to a solids content in the range of about 55 to 65 wt. %, before emptying the contents of said first hopper into said third hopper, and (7) burning the pumpable slurry from said third hopper in a partial oxidation gasifier, furnace, boiler, or incinerator to produce a hot effluent gas stream.

In a preferred embodiment to avoid contaminating the environment, the effluent gas stream is cleaned and purified and non-contaminating ash and slag are separated from the stream of gases. By-product synthesis gas, reducing gas, or fuel gas may be produced. In another embodiment, a hot effluent gas stream is produced in the partial oxidation gasifier, furnace, boiler, or incinerator. This hot gas stream is passed in indirect heat exchange with boiler feed water to produce steam, and said steam is supplied to the steam jacketed processing means (2) and/or the first and/or second steam jacketed rotary disc mixer or heater to provide heat.

BRIEF DESCRIPTION OF THE DRAWING

The invention will be further understood by reference to the accompanying drawing. The drawing is a schematic representation of a preferred embodiment of the process.

DESCRIPTION OF THE INVENTION

With landfills closing, ocean dumping being curtailed, and high-technology incinerators becoming unpopular in many areas, communities are finding that it is getting increasingly more difficult and expensive to dispose of their sewage sludge. Pumpable, chemically disinfected aqueous slurries of sewage sludge or mixtures of sewage sludge and solid carbonaceous fuel are made by the subject process containing high concentrations of sewage sludge. These pumpable slurries may be used as a fuel in a partial oxidation gas generator and may be thereby disposed of without contaminating the atmosphere. After cleaning and removal of undesirable gases e.g. $H_2O$, COS, $CO_2$, a nonpolluting hot raw effluent gas stream comprising at least one of the following is produced: synthesis gas, reducing gas and fuel gas. In one embodiment, the slurry may be burned by complete combustion in a boiler thereby producing by-product steam and hot water. Alternatively, the pumpable slurry may be incinerated or used as fuel in a furnace.

The term "sewage sludge" as used herein may be broadly defined as "water-carried wastes", particularly from municipal sanitary sewage lines, containing at least one of the following: body wastes (excreta), household wastes, community waste such as street washings, etc., and industrial wastes and sludges. The total solids content of the sewage in municipal lines is usually about 500 parts per million (p.p.m.) or more. The solids in sewage are mostly animal or vegetable substances, "organic matter", i.e., fats, carbohydrates, and proteins. Some mineral or inorganic constituents present include sand and clay, as well as the common mineral salts found in the water supply.

Sewage sludge is obtained from raw sewage and may contain a number of pathogens known to be health hazards to humans. Almost any type of microorganism may be found in sewage, including bacteria, protozoa, viruses and fungi.

It is necessary to collect and store large quantities of sewage sludge in order to have enough to fuel a large gasifier disposal unit for a sustained period of time. This would be easier to do if it were disinfected in some manner before shipping it to a centrally located facility. We have unexpectedly found that a biocide comprising glutaraldehyde in the amount of about 0.001 to 1.0 wt. % (basis total wt. of sewage sludge) may be included in the slurry to suppress biological activity for at least four days. Such a stabilization procedure would enable sludge to be transported for long distances or stored for longer periods of time without decomposing, losing its heating value or changing its physical properties.

The chemical stabilizing additive described herein disinfects and inactivates pathogens in sludge. Unlike lime and other alkalizing agents, glutaraldehyde herein does not react with water in the sludge so as to render the sludge less pumpable and more difficult to feed to a gasifier. Further, unlike sodium compounds, there is substantially no increase in sodium concentration in the gas phase resulting from burning the sludge in a gasifier. Accordingly, there is no damage to the refractory walls lining the partial oxidation gas generator.

The slurry of sewage sludge in admixture with supplemental solid carbonaceous fuel, may be reacted with a free oxygen-containing gas by partial oxidation in a free-flow non-catalytic gas generator. Noxious sewage sludge is safely disposed of by the subject process without polluting the nation's environment. Non-contaminating ash and slag are separated from the gas stream. The ash and slag may be used for road bed fill and for making cement blocks. Further, the subject process allows a greater amount of sewage sludge to be fed to a partial oxidation gasifier, boiler, or incinerator while requiring less energy per unit mass of sewage sludge processed. This process has the following advantages:

(a) Noxious sewage or industrial sludge is disinfected and disposed of without polluting the environment, and clean fuel gas and/or synthesis gas is produced.

(b) By-product synthesis gas may be used for the catalytic synthesis of organic chemicals e.g. methanol.

(c) The slag produced during the partial oxidation of the mixed feed of sludge and solid carbonaceous fuel is free of pollutants, and is non-hazardous. Further, it is non-leachable.

(d) The process has a high thermal efficiency. The hot effluent gas stream from the partial oxidation gas generator, furnace, or incinerator may be cooled in a waste heat boiler. Internally generated steam produced in the waste heat boiler may be used to heat the dewatered sewage sludge. The steam may be also used as the working fluid in an expansion turbine.

A typical ultimate analysis of sewage sludge is shown in Table I. A typical ultimate analysis of inert non-combustible materials in sewage sludge is shown in Table II.

TABLE I

| TYPICAL ULTIMATE ANALYSIS OF COMBUSTIBLES IN SEWAGE SLUDGE | |
| --- | --- |
| ELEMENT | WT. % |
| CARBON | 54.6 |
| HYDROGEN | 7.9 |

TABLE I-continued

| TYPICAL ULTIMATE ANALYSIS OF COMBUSTIBLES IN SEWAGE SLUDGE | |
| --- | --- |
| ELEMENT | WT. % |
| NITROGEN | 4.5 |
| OXYGEN | 32.0 |
| SULFUR | 1.0 |

TABLE II

| TYPICAL ANALYSIS OF INERT NON-COMBUSTIBLE MATERIALS IN SEWAGE SLUDGE | |
| --- | --- |
| ELEMENT | MG/KG DRY SOLIDS |
| Total Sodium | 1,515 |
| Water Soluble Sodium (mg/l) | 83 |
| Total Potassium | 800 |
| Water Soluble Potassium (mg/l) | 53 |
| Arsenic | 4.58 |
| Beryllium | 0.38 |
| Cadmium | 3.27 |
| Chromium | 244 |
| Copper | 289 |
| Iron | 150 |
| Lead | 147 |
| Zinc | 468 |
| Nickel | 63 |
| Mercury | 0.68 |

The economics of gasifying sewage sludge depend greatly on the tipping fee received from the sludge generating community and the concentration of sewage sludge that can be included in a pumpable slurry destined for the gasifier. Mixtures of sewage sludge containing about 55 to 65 wt. % of solids and liquid hydrocarbonaceous or solid carbonaceous fuel e.g. coal and/or petroleum coke that contain sufficient sewage sludge to be profitably burned are ordinarily too viscous to be pumped. This problem and others have been overcome by the subject invention.

Sewage Sludge is obtained from raw sewage by conventional processing steps and equipment. For example, the sewage from municipal sewage lines is passed through bar screens for the removal of large pieces of stone, wood, metal, and other trash which would clog channels or damage pumps. Coarse heavy inorganic noncombustibles, i.e. gravel, cinders, and sand are then settled out in a grit chamber. The sewage is then separated into an aqueous suspension of sewage sludge and liquids. Concentration of the sewage may be accomplished by any suitable way for separating solids and liquids, e.g. gravity settling, filtration, centrifugation, hydroclone, or a combination thereof. For example, a preferable preliminary procedure is to introduce the screened over-flow from the grit chamber into a primary sedimentation tank such as a continuous clarifier as shown in Perry's Chemical Engineers' Handbook, McGraw-Hill, Fourth Edition, 1963, page 19-50. Detention time in the sedimentation tank is sufficient for producing a pumpable aqueous slurry of primary sludge having a solids content of about 0.5 to 20 wt. %, in about 1 to 24 hours. The primary sedimentation tank may also serve as a hold-up tank to even out discontinuities in the sewage composition. Alternatively, a separate holding tank may be used. In one embodiment, an aqueous slurry of secondary sewage sludge is introduced into the holding tank and mixed with the primary sewage sludge. Secondary sewage sludge has a solids content in the range of about 1 to 10 wt. % and is derived from the liquid overflow from the previously mentioned primary sedimentation tank. The liquid overflow is processed in a conventional manner in order to produce secondary sewage sludge, to reduce the BOD and organic solids content, and to purify and demineralize the waste water which is separated from the secondary sewage sludge. Treatment of the liquid overflow from the primary sedimentation tank may include a combination of any or preferably all of the following steps, depending upon the end use of the water: pH adjustment; reduction of organic solids and BOD to about 20 parts per million or below, preferably by aerated biochemical treatment; clarification, optionally with coagulation; filtration or centrifugation; demineralizing; activated carbon treatment; and disinfection to control bacteria for example by chlorination. Excessively acidic or basic waste waters may be neutralized and the pH adjusted to a level in the range of about 6 to 9. Anaerobic and aerobic biological treatment processes are preferably used to economically abate the bacterial oxygen-consuming pollution caused by the discharge of waste water contaminated with low concentrations of organic matter. Suitable conventional biological processes that may be used include activated sludge units, aerated stabilization basins, and trickling filters. For additional description, see coassigned U.S. Pat. No. 3,687,646, which is incorporated herein by reference.

The purified water may be then used subsequently in the process. For example, it may be used as a coolant of the product gas from the partial oxidation gasifier by direct contact in a quench tank or by indirect heat exchange in a waste heat boiler. By-product steam may be produced after dissolved solids are removed. The hot water or steam may be used for indirect heat exchange with other streams in the subject process. For example, the hot water or steam may be used to preheat the aqueous suspension of sewage sludge. Excess water may be discharged from the system or used externally for industrial applications. The sludge underflow from the primary sedimentation tank comprising primary sewage sludge or from the holding tank comprising primary sewage sludge in admixture with secondary sewage sludge having a solids content of at least 3 wt. % may be dewatered further to produce an aqueous slurry of sewage sludge having a solids content in the range of about 20 to 35 wt. %. Dewatering may be achieved by conventional means, e.g. filter press, hydroclone, centrifuge.

Preparation of a highly loaded sludge-water slurry with desirable rheological properties requires an understanding of primary sludge characteristics and the relationship of these characteristics to the basic interactions among sludge particles. Since the sludge materials contain numerous chemically active sites, the factors which influence the slurry properties are many.

The dewatered aqueous slurry of sewage sludge having a solids content of about 20 to 35 wt. %, such as about 22 to 25 wt. %, is simultaneously heated and intensely sheared at a temperature in the range of about 150° F. to 210° F., such as about 175° F. to 200° F. preferably in the absence of air for a period in the range of about 5.0 seconds to 15 minutes, such as about 30 seconds to 10 minutes in a mixing and shearing means comprising one or two parallel rotatable shafts with each shaft containing a plurality e.g. about 6 to 30 agitators or mixing paddles or blades. One embodiment has two parallel shafts of agitators which rotate in the same direction at a speed of about 50 to 600 rpm within a chamber that conforms closely to the shape of the agitator assembly thereby providing a close clearance e.g. about 0.030" to 0.060" between the agitators and the inside wall of said chamber. A most effective mixing, shearing and self-cleaning action is thereby provided. See U.S. Pat. No. 3,823,921, which is incorporated herein by reference. For example, a suitable continuous processor is made by Teledyne Readco of York, Pa. The flow rate of material through this continuous processor is maintained to provide a residence time in the range of 0.1 to 5 minutes. The rate of shear is about 20 to 500 sec$^{-1}$, such as about 100 to 300 sec$^{-1}$. The materials being processed are provided with backward-forward motion along with progressive forward movement of the materials and effective mixing and self-cleaning action. The particle size is in the range of about 1 to 1000 microns, such as about 40 to 400 microns. A homogeneous pumpable slurry having a solids content in the range of about 22 to 37 wt. % and a viscosity of less than about 2500 centipoise when measured at 180° F., such as less than about 1500 centipoise when measured at 180° F., is thereby produced.

Shearing is a very effective way to improve the slurrying characteristics and solids content of dewatered sewage sludge. In comparison, mild shearing of sewage sludge in a rotor/mixer was treated in coassigned U.S. Pat. Nos. 4,933,086 and 4,983,296, which are incorporated herein by reference.

Optionally, about 0.01 to 5.0 wt. % (basis total wt. of sewage sludge) of an additive comprising alkoxylated alkylphenol nonionic surfactant, such as ethoxylated nonylphenol, having a molecular weight in the range of about 400 to 7000 may be mixed with the coal-water slurry or sludge, and preferably to the coal-water slurry to improve the solids loading of the pumpable slurry. Further, from about 0.001 to 1.0 wt. % (basis total wt. of sewage sludge) of the biocide glutaraldehyde may be optionally added during this mixing stage to minimize the biological activity of the sludge, should there be a need to store the material for a prolonged period.

The profit that can be made from the subsequent burning of the pretreated sewage sludge is determined by the percentage of sewage sludge in the feed to the partial oxidation gasifier; or, alternatively in the feed to the furnace, boiler, or incinerator. Gasification of sewage sludge alone may not be very efficient, as the heating value of sewage sludge is low compared to other fuels such as coal and/or petroleum coke. Mixing the aqueous slurry of sewage sludge with a supplemental fuel selected from the group of solid carbonaceous fuels consisting of coal, petroleum coke, and mixtures thereof and having a higher heating value of at least 6,000 BTU/LB will improve the overall heating value of the slurry. Gasification of such mixtures are thereby rendered highly viable. Accordingly, the solids content of the pretreated aqueous slurry of sewage sludge is increased by mixing with it at least one of the following solid carbonaceous fuel-containing materials: an aqueous slurry of coal and/or petroleum coke having a solids content in the range of about 50 to 70 wt. %, dried coal and/or petroleum coke having a solids content in the range of about 77 to 100 wt. %, such as 95 wt. %, and mixtures thereof. The aforesaid solid carbonaceous fuel-containing material is mixed with the sheared dewatered pumpable slurry of sewage sludge and optionally, with an additive that prevents the increase in sludge slurry viscosity during storage and transport and which increases the solids content of the pumpable aqueous slurry. The solids content of the pumpable mixture of aqueous slurry of sheared sewage sludge and aqueous slurry of solid carbonaceous fuel e.g. coal or powdered solid carbonaceous fuel e.g. coal is about 40 to 54 wt. %. The parts by weight of supplemental solid carbonaceous fuel to pumpable slurry of dewatered sheared sewage sludge are respectively in the range of about 5–7 to 0.5–7. For example, there may be about 6 parts by wt. of solid carbonaceous fuel to 2 parts by wt. of pumpable slurry of dewatered sheared sewage sludge.

The pumpable slurry of sheared sewage sludge leaving the aforesaid shearer-heater continuous processor is mixed with the aforesaid supplemental solid carbonaceous fuel having a temperature in the range of about 50° F. to 150° F. in a conventional pre-mixer, such as a ribbon mixer or an in-line static mixer. The period of mixing is about 0.5 to 5 minutes. The slurry leaving the pre-mixer at a temperature in the range of about 100° F. to 150° F. and a solids content in the range of about 40 to 54 wt. % is passed into a conventional closed steam jacketed continuous first rotary disc mixer/heater where mixing of the materials continues and the mixture is further heated to a temperature in the range of about 150° F. to 200° F. The water content of the slurry mixture leaving and entering the first rotary disc mixer/heater is substantially the same. For example, a Torus Disc processor made by Bepex Corp. Chicago, Ill. may be used in this mixing step. The heated slurry leaving the first rotary disc mixer/heater with a solids content in the range of about 40–54 wt. % is alternately introduced into one of two coal/sludge slurry hoppers. For example, while slurry hopper I is being filled with said coal sludge slurry mixture, the contents of hopper II is tested for water content and cycled between hopper II and a second steam jacketed continuous rotary disc mixer/heater where said slurry mixture is dewatered to produce vaporized water and a pumpable solid carbonaceous fuel/sludge thickened slurry. The cycling is continued at the same temperature e.g. about 200° F. to 225° F. until the water content of the thickened slurry is in a specified range e.g. about 55–65 wt. %. The thickened solid carbonaceous fuel/sludge slurry is then passed from hopper II to a third slurry hopper. From there it is pumped as feedstock into a partial oxidation gasifier or burned as a fuel in a furnace, boiler, or incinerator. After hopper II is emptied, it is filled in the manner described previously for hopper I. While hopper II is being filled, the solid carbonaceous fuel/sludge slurry mixture in hopper I is tested for water content and cycled between said hopper I and said second steam jacketed continuous rotary disc mixer/heater until the desired water content in a specified range e.g. about 55–65 wt. % is achieved in the manner described previously for the contents of hopper II. The contents of hopper I are then discharged into hopper III.

Each of the previously described first and second rotary disc mixer/heater processors comprises a horizontal vessel containing a tubular hollow rotor shaft with a plurality e.g. about 9–20 parallel spaced double wall hollow discs perpendicularly mounted on said rotor shaft. Heat transfer fluids e.g. steam flows though the hollow tubular rotor shaft and the hollow discs. Steam also flows through the jacket surrounding the rotor shaft. Conveying vanes on the outer rim of the discs cause the materials to be transported in an axial direction through the annular space between the discs from the feed end to the discharge end. Residence times in said first and second rotary disc mixer/heaters are in the range of about 4 to 30 minutes. The discs rotate at a speed in the range of about 20 to 100 revolutions per minute, such as about 30 to 50 rpm. The discs provide about 85% of the total heating surface. Other heating surfaces are the rotor shaft and the inner wall of the steam jacketed vessel trough. Water is intentionally vaporized from the slurry passing only through the second rotary disc mixer/heater. The vaporized water may be cooled, condensed, and recycled to the solid carbonaceous fuel slurry preparation zone. The pumpable slurry of sewage sludge and supplemental fuel leaving the first and/or second rotary disc mixer-heaters has a higher heating value on a dry basis in the range of about 6,000 to 16,000 BTU/LB, such as about 7,000 to 10,000 BTU/LB. The pumpable slurry leaving the third hopper is burned in a partial oxidation gasifier, furnace, boiler, or incinerator to produce an effluent gas stream. In one embodiment, the effluent gas stream is washed and purified. Non-polluting ash and noxious gases are removed by conventional means. Contamination of the environment is prevented.

The term "solid carbonaceous fuel" as used herein is intended to include a high rank fuel selected from the group consisting of anthracite coal, bituminous coal, coke from coal, char from coal, coal liquefaction residues, particulate carbon, petroleum coke, solids derived from oil shale, tar sands, pitch, and mixtures thereof.

Any suitable grinding system may be used to convert the solid carbonaceous fuels or mixtures thereof to the proper size. The solid carbonaceous fuels are preferably ground to a particle size so that 100% of the material passes through an ASTM E11-70 Sieve Designation Standard 1.4 mm (Alternative No. 14).

The term "coal" as used herein is intended to mean a material selected from the group consisting of anthracite, bituminous, lignite, residue derived from coal liquefaction, shale, asphalt, and mixtures thereof. The term "petroleum coke" is used herein in its conventional manner and includes petroleum coke made by conventional delayed or fluid coking processes. The term "and/or" is used herein in its normal sense. For example, "A and/or B" means either A or B, or A and B.

In a preferred embodiment, the fuel feedstream, for example the aqueous slurry of sewage sludge and coal and/or petroleum coke and a stream of free-oxygen containing gas are introduced by means of a burner into a free-flow unobstructed down-flowing vertical refractory lined steel wall pressure vessel where the partial oxidation reaction takes place. A typical gas generator is shown and described in coassigned U.S. Pat. No. 3,544,291, which is incorporated herein by reference. The burner assembly is inserted downward through a top inlet port of the noncatalytic synthesis gas generator. The burner extends along the central longitudinal axis of the gas generator with the downstream end discharging a multiphase mixture of fuel, free-oxygen containing gas, and temperature moderator directly into the reaction zone.

A three or four stream annular type burner, such as shown and described in coassigned U.S. Pat. Nos. 3,847,564 and 4,525,175, which are incorporated herein by reference, may be used to introduce the feedstreams into the partial oxidation gas generator. For example, with respect to the burner shown in U.S. Pat. No. 3,847,564, free-oxygen containing gas may be simultaneously passed through the central conduit 18 and outer annular passage 14 of said burner. The free-oxygen containing gas is selected from the group consisting of substantially pure oxygen i.e. greater than 95 mole % $O_2$, oxygen-enriched air i.e. greater than 21 mole % $O_2$, and air. The free-oxygen containing gas is supplied at a temperature in the range of about 100° F. to 1000° F. The aqueous slurry of pretreated sewage sludge and solid carbonaceous fuel e.g. coal and/or petroleum coke is passed through the intermediate annular passage 16 at a temperature in the range of about ambient to 650° F.

In the partial oxidation process, the weight ratio of $H_2O$ to carbon in the feed is in the range of about 0.2 to 3.0, such as about 1.0 to 2.0. The atomic ratio of free-oxygen to carbon in the feed is in the range of about 0.85 to 1.5, such as about 1.0 to 1.2. Advantageously, the high amount of combined oxygen in the sewage sludge reduces the amount of free-oxygen.

The relative proportions of solid fuels, sewage sludge, water and oxygen in the feedstreams to the partial oxidation gas generator are carefully regulated to convert a substantial portion of the carbon in the fuel e.g., up to about 90% or more by weight, to carbon oxides; and to maintain an autogenous reaction zone temperature in the range of about 1800° F. to 3500° F. The pressure is in the range of about 1–35 atmospheres. Preferably the temperature in the gasifier is in the range of about 2200° F. to 2800° F., so that molten slag is produced.

The dwell time in the reaction zone of the gasifier is in the range of about 1 to 10 seconds, and preferably in the range of about 2 to 8 seconds. With substantially pure oxygen feed to the partial oxidation gas generator, the composition of the effluent gas from the gas generator in mole % dry basis may be as follows: $H_2$ 10 to 60, CO 20 to 60, $CO_2$ 5 to 40, $CH_4$ 0.01 to 5, $H_2S+COS$ 0 to 5, $N_2$ nil to 5, and Ar nil to 1.5. With air feed to the gas generator, the composition of the generator effluent gas in mole % dry basis may be about as follows: $H_2$ 2 to 20, CO 5 to 35, $CO_2$ 5 to 25, $CH_4$ 0 to 2, $H_2S+COS$ 0 to 3, $N_2$ 45 to 80, and Ar 0.5 to 1.5. Unconverted carbon, ash, or molten slag are contained in the effluent gas stream. Depending on the composition and use, the effluent gas stream from the partial oxidation gasifier is called synthesis gas, reducing gas, or fuel gas. Coal has a high ash content e.g. about 10 to 30 wt. %. Advantageously, when coal is used as the supplemental fuel the coal ash will encapsulate the non-combustible materials in the sewage sludge, and the encapsulated material will flow from the reaction zone of the gas generator as substantially inert molten slag.

The hot gaseous effluent stream from the reaction zone of the synthesis gas generator is quickly cooled below the reaction temperature to a temperature in the range of about 250° F. to 700° F. by direct quenching in water, or by indirect heat exchange for example with water to produce steam in a gas cooler. The gas stream from the partial oxidation gasifier or the flue gas from the furnace, boiler, or incinerator may be cleaned and purified by conventional methods. For example, reference is made to coassigned U.S. Pat. No. 4,052,176, which is included herein by reference for removal of $H_2S$, COS, and $CO_2$. Fly-ash and slag maybe removed by quenching the process gas stream in a conventional quench tank and/or by scrubbing. See coassigned U.S. Pat. Nos. 3,232,728; 3,524,630; and 4,801,307, which are incorporated herein by reference.

DESCRIPTION OF THE DRAWING

A more complete understanding of the invention may be had by reference to the accompanying drawing which illustrates a preferred embodiment of the invention. It is not intended to limit the subject invention to the particular process or materials described.

Dewatered municipal sanitary sewage sludge having a solids content in the range of about 20 to 35 wt. % in line 1 is introduced into surge hopper 2 where it feeds into conveyor 3 and is then transported through line 4 into weigh belt feeder 5, line 6, and continuous processor shearer-heater 7 in which said sewage sludge is held for a residence time of between 0.1 and 5 minutes and which has plurality of flat or helical shaped blades 8 on shaft 9 driven by motor 10. The rate of shear is about 20 to 500 seconds$^{-1}$. The process period is about 5 minutes at a temperature of about 175° F. Processor 7 is heated by steam from line 11 entering steam jacket 12 at the downstream end of processor 7 and leaving as condensate from line 13 at the upstream end. Steam and vaporizable materials may be removed through line 14. A pumpable slurry of sewage sludge having a solids content in the range of about 22 to 37 wt. % leaves processor 7 by way of line 15 and is passed into static or ribbon premixer 20 at a temperature in the range of about 150° F. to 210° F. by way of line 15. An aqueous slurry of coal at a temperature in the range of about ambient to 150° F. and a solids content in the range of about 50 to 70 wt. % is passed through line 24 and into premixer 20.

The aqueous slurry of sewage sludge and coal leaving pre-mixer 20 at a temperature in the range of about 100° F. to 150° F. and a solids content in the range of about 40–54 wt. % is passed through line 31, valve 32, line 33 and is further heated and mixed in closed rotary disc mixer/heater 40. The period of mixing is about 10 min. at a temperature in the range of about 150° F. to 200° F. Motor 42 drives hollow shaft 43 on which are perpendicularly mounted a plurality of hollow disc rotors 44. Steam in line 45 is passed into steam jacket 46, hollow shaft 43, and hollow disc rotors 44. Steam condensate leaves through line 47. In one embodiment, an insignificant amount of steam and/or other vaporizable material is removed from mixer/heater 40, and cooled, condensed and combined with steam and other vaporizable materials from mixer/heater 70 in line 84. A pumpable slurry of sewage sludge and supplemental fuel having a total solids content in the range of about 40 to 54 wt. % leaves through line 49, valve 50, and line 51. The mixture in line 51 is passed into coal/sludge slurry hopper 56 or 57, whichever is empty, by way of line 58, valve 59 and line 60 or by way of line 62, valve 63, and line 64.

After hopper 56 or 57 is filled, the water content of the slurry mixture in the filled hopper, for example hopper 56, is determined by conventional methods. The solids content of the slurry in hopper 56 is then increased to the desired level e.g. in the range of about 55 to 65 wt. % by passing the slurry mixture through lines 65, 66, valve 67, lines 68 and 69 and rotary disc mixer/heater 70. During the aforesaid filling of hopper 56, valves 77, 63, 67 and 92 are closed. Simultaneously with the filling of hopper 56, the water content of the coal/sludge slurry in hopper 57 is being adjusted by cycling the contents between hopper 57 and rotary mixer/heater 70. After said adjustment, valves 88, 89, and 92 are closed, valve 87 is opened, and the contents of hopper 57 are emptied into hopper 97. Valves 87 and 59 are closed, valves 50 and 63 are opened, and hopper 57 is then filled. Simultaneously with the filling of hopper 57, the water content of the coal/sludge slurry in hopper 56 is adjusted by cycling the contents between hopper 56 and rotary mixer/heater 70 as previously described.

When the contents of hopper 56 are cycled to mixer/heater 70, the thickened sewage sludge mixture from mixer/heater 70 is returned to hopper 56 at a temperature in the range of about 200° F. to 225° F. by way of lines 75, 76, valve 77, and line 78. The temperature in mixer/heater 70 is maintained in the range of about 200° F. to 225° F. by steam passing through line 79 and into jacket 80, hollow shaft 81, and hollow disc rotors 82. Steam condensate leaves through line 83. Steam and other vaporizable materials leave through line 84 and are cooled and condensed in a cooler (not shown). The liquid water produced is preferably used in preparation of the coal slurry. Shaft 81 is rotated by motor 85. The cycling of the sewage sludge between hopper 56 and mixer/heater 70 continues until the desired solids content of the coal/sludge slurry is reached, for example a value in the range of about 55–65 wt. %. After the desired water content of the coal/sludge slurry in hopper 56 is reached, valve 92 opens and the contents of hopper 56 are passed through lines 65, 71, valve 92, lines 72 and 96 and into hopper 97.

While the pumpable water content in the sewage sludge mixture in hopper 56 is being adjusted in the manner as previously described, hopper 57 is being filled in the manner described previously for hopper 56. Then, after hopper 57 is filled and the water content of the slurry in hopper 57 is determined, valves 67 and 87 are closed, valve 88 is opened, and the contents of hopper 57 are cycled between hopper 57 and mixer/heater 70 where they are dewatered. With valve 77 closed and valve 89 opened, the pumpable thickened sewage sludge mixture from mixer/heater 70 at a temperature in the range of about 200° F. to 225° F. is passed through lines 75, 90, valve 89, and line 91 into hopper 57. The cycling of the sewage sludge between hopper 57 and mixer/heater 70 is continued until the desired solids content in the range, for example, of about 55 to 65 wt. % is obtained. With valves 88 and 92 closed and valve 87 opened, the contents of hopper 57 are then passed through lines 93, 94, valve 87, lines 95 and 96 into bottom hopper 97. The coal/sludge slurry contents in hopper 97 are passed through bottom line 98 and into feed pump 99. The coal/sludge slurry is pumped as feedstock through line 100 and into a partial oxidation gasifier, furnace, boiler, or incinerator (not shown).

The coal-sewage sludge slurry in line 100 is passed into a partial oxidation gasifier, furnace, boiler or incinerator where it is burned as fuel to produce a hot effluent gas stream at a temperature in the range of about 1800° F. to 3000° F. Steam produced by indirect heat exchange between boiler feed water and said hot effluent gas may be passed through at least one of the following: (1) lines 45 and/or 79 to provide heat for rotary disc mixer/heaters 40 and/or 70, and (2) line 11 to provide heat for shearer-heater continuous processor 7. In one embodiment, the hot effluent gas may be cleaned and purified by conventional methods to make it environmentally acceptable.

Although modifications and variations of the invention may be made without departing from the spirit and scope thereof, only such limitations should be imposed as are indicated in the appended claims.

We claim:

1. A process for disposing of sewage sludge comprising the steps of:

(1) heating and shearing an aqueous mixture of sewage sludge at a temperature in the range of about 150° to 210° F. in a tubular-shaped processing means containing a plurality of rotating agitators to produce a pumpable aqueous slurry of sewage sludge;

(2) mixing said aqueous slurry of sewage sludge from (1) with solid carbonaceous fuel or an aqueous slurry of solid carbonaceous fuel to produce a pumpable aqueous slurry of sewage sludge and solid carbonaceous fuel;

(3) heating said aqueous slurry of sewage sludge and solid carbonaceous fuel from (2) in a first steam jacketed rotary disc mixing-heating means at a temperature in the range of about 150° F. to 200° F.; and removing a pumpable aqueous slurry of sewage sludge and solid carbonaceous fuel from said first rotary disc mixing-heating means;

(4) alternately filling and cycling first and second hoppers with said pumpable aqueous slurry of sewage sludge and solid carbonaceous fuel from said first rotary disc mixing-heating means wherein as one hopper is being filled the contents of the other hopper is being cycled as provided in (5) and (6);

(5) introducing aqueous slurry of sewage sludge and solid carbonaceous fuel from said second hopper into a second steam jacketed rotary disc mixing-heating means where the temperature of said slurry is maintained in the range of about 200° to 225° F.; separating steam and other vaporizable materials from dewatered aqueous slurry of sewage sludge and solid carbonaceous fuel; cycling said dewatered aqueous slurry of sewage sludge and solid carbonaceous fuel between said second stem jacketed rotary disc mixing-heating means and said second hopper; and emptying said dewatered slurry of sewage sludge and solid carbonaceous fuel from said second hopper into a third hopper when the dewatered aqueous slurry of sewage sludge and solid carbonaceous fuel in said second hopper has a solids content in the range of about 55 to 65 wt. %; and refilling said second hopper as provided in (4);

(6) introducing aqueous slurry of sewage sludge and solid carbonaceous fuel from said first hopper into said second steam jacketed rotary disc mixing-heating means where the temperature of said slurry is maintained in the range of about 200° to 225° F.; separating steam and other vaporizable materials from dewatered aqueous slurry of sewage sludge and solid carbonaceous fuel; cycling said dewatered aqueous slurry of sewage sludge and solid carbonaceous fuel between said second steam jacketed rotary disc mixing-heating means and said first hopper; and emptying said dewatered slurry of sewage sludge and solid carbonaceous fuel from said first hopper into said third hopper when the dewatered aqueous slurry of sewage sludge and solid carbonaceous fuel in said first slurry hopper has a solids content in the range of about 55 to 65 wt. %; and refilling said first hopper as provided in (4); and (7) burning the pumpable slurry from said third hopper in a partial oxidation gasifier, furnace, boiler, or incinerator to produce a hot effluent gas stream.

2. The process of claim 1 wherein said solid carbonaceous fuel is selected from the group consisting of anthracite coal, bituminous coal, coke from coal, char from coal, coal liquefaction residues, particulate carbon, petroleum coke, solids derived from oil shale, tar sands, pitch, and mixtures thereof.

3. A process for disposing of sewage sludge comprising:
   (1) dewatering an aqueous slurry of sewage sludge having a solids content of at least 3 wt. % to produce an aqueous mixture of sewage sludge having a solids content in the range of about 20 to 35 wt. %;
   (2) simultaneously heating and shearing the aqueous mixture of sewage sludge from (1) at a temperature in the range of about 150° F. to 210° F. in the absence of air for a period in the range of about 5.0 seconds to 15 minutes while being passed through a steam jacketed tubular-shaped processing means contain a plurality of rotating agitators thereby removing steam and vaporizable materials and producing a pumpable aqueous slurry of sewage sludge at a temperature in the range of about 150° F. to 210° F and having a solids content in the range of about 22 to 37 wt. % and a viscosity of less than about 2500 centipoise when measured at 180° F.;
   (3) mixing the pumpable aqueous slurry of sewage sludge from (2) with a supplemental fuel selected from the group consisting of solid carbonaceous fuel having a solids content of about 77 to 100 wt. %, an aqueous slurry of solid carbonaceous fuel having a solids content in the range of about 50 to 70 wt. %, and mixtures thereof; wherein a pumpable aqueous slurry of sewage sludge and said supplemental fuel is produced having a solids content in the range of about 40 to 54 wt. %;
   (4) heating said pumpable aqueous slurry of sewage sludge and solid carbonaceous fuel from (3) in a first steam jacketed rotary disc mixing-heating means; and removing a pumpable aqueous slurry of sewage sludge and solid carbonaceous fuel having a temperature in the range of about 150° F. to 200° F. and a solids content in the range of about 40 to 54 wt. % from said first rotary disc mixing-heating means;
   (5) alternately filling and cycling first and second slurry hoppers with said pumpable aqueous slurry of sewage sludge and solid carbonaceous fuel from said first rotary-disc mixing-heating means; wherein as one hopper is being filled the contents of the other hopper is being cycled as provided in (6) and (7);
   (6) introducing said aqueous slurry of sewage sludge and solid carbonaceous fuel from said second slurry hopper in
   (5) into a second stem jacketed rotary disc mixing-heating means where the temperature of said slurry is maintained int he range of about 200° to 225° F., separating steam and other vaporizable materials from dewatered aqueous slurry of sewage sludge and solid carbonaceous fuel, cycling said dewatered aqueous slurry of sewage sludge and solid carbonaceous fuel between said second stem jacketed rotary disc mixing-heating means and said second slurry hopper, and introducing all of the dewatered aqueous slurry of sewage sludge and solid carbonaceous fuel in said second slurry hopper into a third slurry hopper when dewatered aqueous slurry of sewage sludge and solid carbonaceous fuel in said second slurry hopper has a solids content in the range of about 55 to 65 wt. %;
   (7) introducing said aqueous slurry of sewage sludge and solid carbonaceous fuel from said first slurry hopper in (5) into said second steam jacketed rotary disc mixing-heating means where the temperature of sad slurry is maintained in the range of about 200° to 225° F, separating steam and other vaporizable materials from dewatered aqueous slurry of sewage sludge and solid carbonaceous fuel, cycling said dewatered aqueous slurry of sewage sludge and solid carbonaceous fuel between said second steam jacketed rotary disc mixing-heating means and said first slurry hopper, and introducing all of the dewatered aqueous slurry of sewage sludge and solid carbonaceous fuel in said first slurry hopper into said third slurry hopper when said dewatered aqueous slurry of sewage sludge and solid carbonaceous fuel in said first slurry hopper has a solids content in the range of about 55 and 65 wt. %; and
   (8) burning the pumpable slurry from said third hopper in a partial oxidation gasifier, furnace, boiler, or incinerator to produce a hot effluent gas stream.

4. The process of claim 3 wherein said tubular shaped processing means in (2) contains two parallel shafts with each shaft holding a plurality of agitators that rotate in the same direction at a speed of about 50 to 600 rpm thereby providing a shear rate in the range of about 20 to 500 seconds$^{-1}$.

5. The process of claim 3 wherein the rotary discs in (4) revolve at a speed in the range of about 20 to 100 rpm and the residence time in said mixer/heater is in the range of about 4 to 30 minutes.

6. The process of claim 3 provided with the steps of washing and purifying the effluent gas stream from (8) and separating non-polluting ash and slag.

7. The process of claim 3 where in (3), about 5 to 7 parts by wt. of supplemental fuel are mixed with 0.5 to 7 parts by weight of said pumpable slurry of sewage sludge from (2).

8. The process of claim 3 provided with introducing into (2) and/or (3) about 0.01 to 5.0 wt. % of alkoxylated alkylphenol additive (basis total weight of sewage sludge) to increase the pumpability of the material being processed.

9. The process of claim 3 provided with introducing in (2) and/or (3) about 0.001 to 1.0 wt. % (basis total weight of sewage sludge) of a disinfectant comprising glutaraldehyde to minimize the biological activity of the sludge.

10. The process of claim 3 wherein the residence time in said mixing stages in (3), (4), and (6) and (7) are respectively in the range of about 0.5 to 5 minutes for (3), and 4 to 30 minutes for (4) and (6) and (7).

11. The process of claim 3 where in (8) said pumpable slurry is burned in a partial oxidation gasifier with a free-oxygen containing gas at a temperature in the range of about 1800° F. to 3500° F., a pressure in the range of about 1 to 35 atmospheres, a weight ratio of $H_2O$ to carbon in the feed in the range of about 0.2 to 3.0, and an atomic ratio of free-oxygen to carbon in the range of about 0.85 to 1.5 to produce a hot effluent stream of synthesis gas, reducing gas or fuel gas.

12. The process of claim 3 wherein said supplemental fuel in (3) is an aqueous slurry of solid carbonaceous fuel, and provided with the step of mixing the water separated from said aqueous slurry of sewage sludge in (1) and (2) and from said aqueous slurry of sewage sludge and solid carbonaceous fuel in (6) and (7) with solid carbonaceous fuel to produce said aqueous slurry of solid carbonaceous fuel in (3).

13. The process of claim 3 wherein the hot effluent gas stream from (8) is passed in indirect heat exchange with boiler feed water to produce steam.

14. The process of claim 13 wherein said steam is introduced into the steam jacketed processing means in (2) to provide heat.

15. The process of claim 13 wherein said steam is introduced into said steam jacketed rotary disc mixer/heater means in (4) and/or (6) and/or (7) to provide heat.

* * * * *